UNITED STATES PATENT OFFICE.

EDWIN R. MURDOCK, OF TIGERTON, WISCONSIN, ASSIGNOR OF ONE-HALF TO CHRISTOPHER GJERMUNDSON, OF SAME PLACE.

FIRE-KINDLER.

SPECIFICATION forming part of Letters Patent No. 468,427, dated February 9, 1892.

Application filed October 23, 1891. Serial No. 409,618. (No specimens.)

*To all whom it may concern:*

Be it known that I, EDWIN R. MURDOCK, a citizen of the United States, residing at Tigerton, in the county of Shawano and State of Wisconsin, have invented certain new and useful Improvements in Fire-Kindlers; and I do hereby declare the following to be a full, clear, and exact description of the invention, such as will enable others skilled in the art to which it appertains to make and use the same.

My invention relates to fire-kindlers, and has for its object to furnish a non-explosive composition in a convenient form, which will have the properties of igniting quickly and burning with a slow flame, and will, by reason of certain of its ingredients, give out a pleasant odor while burning.

My composition consists of the following ingredients combined in the proportions stated, viz: Beef-tallow, one pound; rosin, five pounds; yellow cornmeal, one quart; camphor-gum, two ounces; sassafras-root bark, (pulverized,) two ounces; alcohol, two ounces; pine sawdust, about one bushel. These ingredients, with the exception of the sawdust, are melted in a suitable vessel and constantly stirred. The sawdust is then added and thoroughly mixed until the desired consistency is attained. The mass is then poured into pans, preferably of galvanized iron, and allowed to cool. Before the mass sets it is cut by a suitable knife into rectangular blocks of the desired size, which, when hardened, are ready for use.

My improved fire-kindler, by reason of its peculiar composition, has many properties which render it very desirable for use. The absence of any explosive ingredient makes it perfectly safe to handle and the addition of the sassafras-bark and camphor causes it to burn with a pleasant odor. It is quick to ignite, but burns very slowly, and hence is very efficient as a kindler for coal and hard woods.

I claim as my invention—

A composition for fire-kindlers, consisting of beef-tallow, rosin, yellow cornmeal, camphor-gum, sassafras-root bark, alcohol, and sawdust in the proportions specified.

In testimony whereof I affix my signature in presence of two witnesses.

EDWIN R. MURDOCK.

Witnesses:
T. W. HOGAN,
GEO. H. SCHINTZ.